United States Patent [19]

Durboraw, III

[11] 4,381,508
[45] Apr. 26, 1983

[54] CLUTTER COMPENSATED SIDELOBE CANCELLING COMMUNICATIONS SYSTEM

[75] Inventor: Isaac N. Durboraw, III, Scottsdale, Ariz.

[73] Assignee: Motorola Inc., Schaumburg, Ill.

[21] Appl. No.: 19,379

[22] Filed: Mar. 12, 1979

[51] Int. Cl.³ .............................................. G01S 1/14
[52] U.S. Cl. ........................... 343/100 LE; 343/5 NQ
[58] Field of Search ...................... 343/100 LE, 5 NQ

[56] References Cited

U.S. PATENT DOCUMENTS

| | | | |
|---|---|---|---|
| 3,881,177 | 4/1975 | Len et al. ................. | 343/100 LE X |
| 3,978,483 | 8/1976 | Lewis et al. ................. | 343/100 LE |
| 3,982,245 | 9/1976 | Soule, Jr. et al. ............ | 343/100 LE |
| 4,097,866 | 6/1978 | Frost et al. ................... | 343/100 LE |
| 4,119,962 | 10/1978 | Lewis ....................... | 343/100 LE X |
| 4,119,963 | 10/1978 | Zwarts et al. ............ | 343/100 LE X |

*Primary Examiner*—Malcolm F. Hubler
*Attorney, Agent, or Firm*—Eugene A. Parsons

[57] ABSTRACT

A communications system including main and auxiliary antennas for reducing sidelobe interference with circuitry included in the feedback loop for estimating clutter by determining the difference between repetitious signals and subtracting a portion of the difference in the proper time sequence, relatively rapid changes between repetitous signals being composed generally of clutter.

10 Claims, 1 Drawing Figure

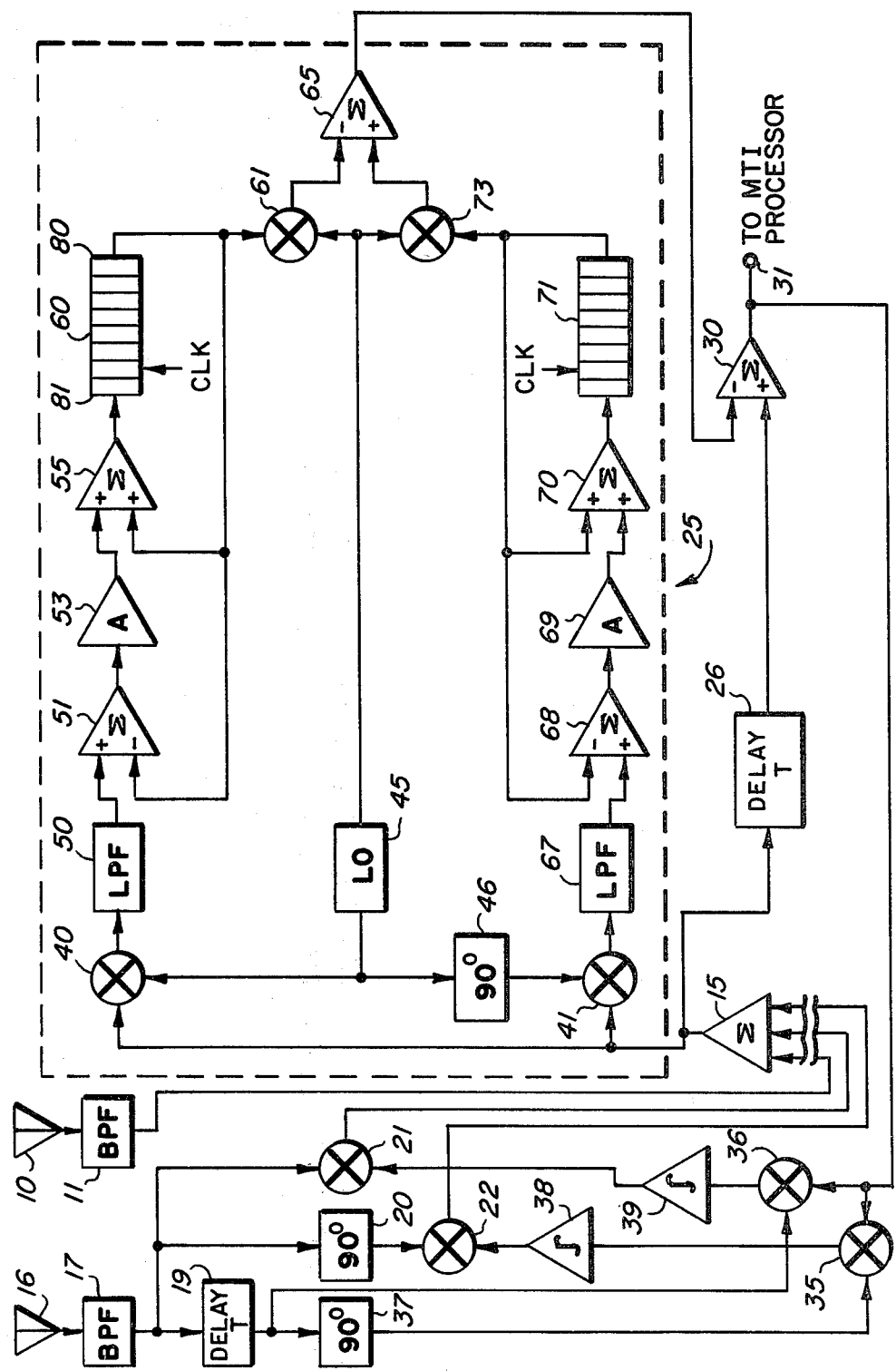

CLUTTER COMPENSATED SIDELOBE CANCELLING COMMUNICATIONS SYSTEM

BACKGROUND OF THE INVENTION

In communications systems, and especially repetitive signal systems such as radar and the like, clutter, including background noise and noise in the system, can cause extremely difficult problems in identifying return signals. Clutter is an especially difficult problem in existing sidelobe cancelling circuits because clutter signal strength produces a substantial limitation on jammer cancellation performance. Typical existing sidelobe cancelling circuits (adaptive antenna systems) are disclosed in an article by B. Widrow et al, "Adaptive Antenna Systems", Procedure of the IEEE, Volume 55, Number 12, Dec. 1967; U.S. Pat. No. 3,202,990 entitled "Intermediate Frequency Sidelobe Canceller", issued Aug. 24, 1965; U.S. Pat. No. 3,290,684, entitled "Directional Receving System", issued Dec. 6, 1966; U.S. Pat. No. 4,079,379, entitled "Null Steering Apparatus for a Multiple Antenna Array", issued Mar. 14, 1978; and U.S. Pat. No. 4,070,675, entitled "Power Rejection Apparatus Using a Null Constrained Subarray for MTI Radar Applications", issued Jan. 24, 1978.

SUMMARY OF THE INVENTION

The present invention pertains to clutter compensating circuitry in conjuction with communications systems including circuitry for cancelling sidelobe interference wherein the clutter compensating circuitry includes storage circuitry for storing a first portion of a signal, comparing circuitry for comparing a subsequent portion of the signal to the stored portion and updating the stored portion with the difference obtained from the comparison, and connecting circuitry for using the updated stored portion in a proper time sequence to reduce clutter in the original signal.

It is an object of the present invention to provide new and improved clutter compensating circuitry for use in conjunction with communications systems including circuitry for cancelling sidelobe interference.

It is a further object of the present invention to provide new and improved clutter compensating circuitry for producing periodically updated estimates of clutter in the output signal of a communications system.

It is a further object of the present invention to provide a new and improved method of estimating clutter in the output of a communications system and for compensating therefor.

These and other objects of this invention will become apparent to those skilled in the art upon consideration of the accompanying specification, claims and drawing.

BRIEF DESCRIPTION OF THE DRAWING

The single FIGURE is a block diagram of a communications system including circuitry for cancelling sidelobe interference and clutter compensating circuitry embodying the present invention.

DESCRIPTION OF THE PREFERRED EMBODIMENT

Referring specifically to the FIGURE, the number 10 designates a main antenna, which may be for example a directional type antenna. The antenna 10 is connected through a bandpass filter 11 and other circuitry (not shown) to one input of a summing device 15. The broken line between the bandpass filter 11 and summing device 15 indicates that apparatus not pertinent to this invention is omitted therefrom. Generally, this omitted apparatus is referred to as a receiver and may be, for example, apparatus for converting the signal to an intermediate frequency signal, amplifying devices, etc.

The number 16 indicates an auxiliary antenna, which generally will be an omnidirectional antenna. Also, in sidelobe cancelling circuitry of this type it will be understood by those skilled in the art that additional auxiliary antennas may be utilized since it is generally well known that an auxiliary antenna and the associated sidelobe cancelling circuitry is required for each interference signal to be cancelled. However, in the present embodiment only one auxiliary antenna 16 is illustrated for convenience and a complete sidelobe interference cancelling system is described therewith.

The auxiliary antenna 16 is connected through a bandpass filter 17 to a delay 19, a 90° phase shifting network 20 and a mixer or weighting device 21. The output of the phase shifting device 20 is connected to an input of a second mixer or weighting device 22. The outputs of the weighting devices 21 and 22 are connected to two more inputs of the summing device 15 (the broken lines indicating that additional equipment such as receivers have been eliminated because it does not form a portion of this invention or in any way effect the operation thereof). The output of the summing device 15 is connected to a clutter compensating circuit, generally designated 25 (enclosed within dotted lines) and to a delay 26. An output of the clutter compensating circuit 25 is connected to a negative input of a summing device 30 and the output of the delay circuit 26 is connected to a positive input of the summing device 30. An output of the summing device 30 is applied to an output terminal 31, which serves as an output for the system and, as illustrated, may apply the output signals to, for example, an MTI processor. The output of the summing device 30 is also connected to inputs of a pair of mixers or correlation circuits 35 and 36. The output of the delay circuit 19 is connected to a second input of the correlation circuit 36 and through a 90° phase shift circuit 37 to a second input of the correlation circuit 35. The correlation circuits 35 and 36 each compare signals at the two inputs thereof and provide an output signal which is indicative of correlation between the two input signals. The outputs of the correlation circuits 35 and 36 are connected through integrater amplifiers 38 and 39, respectively, to inputs of mixers or weighting circuits 22 and 21, respectively. The output signals of the integrator amplifiers 38 and 39 are essentially weighting control signals which adjust the weighting devices 22 and 21 to minimize the control signals or minimize correlation between signals applied to the correlation circuits 35 and 36. The phase and amplitude (weighting) of the signals applied to the summing device 15 from the weighting devices 21 and 22 will be such as to cause cancellation of a portion of the signal from the main antenna 10 which is received by the auxiliary antenna 16 and which is correlated with the clutter compensated signal appearing at the output of terminal 31.

The combined signal at the output of the summing device 15 and present at the input of the clutter compensating circuit 25 is applied to inputs of a pair of mixers 40 and 41. A local oscillator 45 applies a second signal to the mixer 40 and applied a second signal through a phase shifting circuit 46 to the mixer 41. The combined signal at the output of the summing device 15 is generally at an intermediate frequency and the clutter compensating circuit 25, as disclosed in this embodiment, operates at the base band frequency so that the local oscillator 45 and mixers 40 and 41 are used to convert the intermediate frequency combined signal to in-phase and quadrature components of the combined signal at baseband frequency. The output of the mixer 40 which is the in-phase component of the combined signal, is connected through a low pass filter 50 to a positive terminal of a summing circuit 51. The output of the summing circuit 51 is applied through an amplifier 53, which supplies an amplification factor of A to a positive input of a second summing circuit 55. The output of the summing circuit 55 is connected to an input of a clocked memory or storage device 60, which may be for example a capacitive coupled device (CCD) or a shift register or the like. An output of the storage device 60 is connected to a negative input of the summing circuit 51, a positive input of the summing circuit 55 and an input of a mixer 61. The output of the local oscillator 45 is connected to a second input of the mixer 61 and the output thereof is connected to a positive terminal of a summing circuit 65. The quadrature component of the combined signal at the output of the mixer 41 passes through a low pass filter 67, a summing circuit 68, and amplifier 69 having an amplification factor of A, a second summing circuit 70, a storage device 71 and a mixer 73, all of which are connected as described in conjuction with the in-phase component of the combined signal.

In the operation of the clutter compensating circuit 25 and referring to the in-phase component of the combined signal as an example, the low pass filter 50 removes un-wanted high frequency noise and the summing circuit 51 compares the difference between the stored signal in the storing device 60 and the next portion or current signal from the summing device 15. Assuming that the communications system disclosed is a pulsed radar with range bins (the operation of which is well known in the art) the storage device 60 has sufficient elements therein to store the data in each range bin in a separate element. The clocking of the storage device 60 is sufficiently high to circulate all of the data in all of the elements once per radar pulse (between the actual transmitted pulses). Thus, the data stored in the first element, designated by the number 80, will always be compared to the first range bin of the return pulse in the summing device 51 and the last element, designated 81, will always be compared with the final range bin in the radar return by the summing device 51.

The summing device 51 provides a signal indicative of the difference between the two signals applied to the inputs thereof and the amplifier 53 supplies an amplification factor of A to the signal. In general, the amplification factor A will be between 0 and 1 and should be relatively high (near unity) for fast changing back ground scenes and near 0 for slow changing scenes. The amplifier 53 may have an automatically varying amplification factor, it may be adjusted manually by an operator or it may be fixed at some convenient level depending upon the expected background. In essence, the amplifier 53 selects only a portion of the output of the summing device 51 and couples it to the summing device 55. The summing device 55 also receives the output of the storage device 60 directly so that it periodically updates the estimate of clutter stored in the storage device 60. The output of the storage device 60 is again converted to an appropriate intermediate frequency by the mixer 61 and recombined with the quadrature component, which is operated upon as described in conjunction with the in-phase component. The output of the summing device 65, which is an updated estimate of clutter, is applied to the summing device 30 where it is subtracted from the combined signal after the combined signal is delayed in the delay 26 sufficiently to provide a proper time sequence. Generally, the delay 26 may be a CCD or a shift register equivalent to the devices 60 or 71 so as to delay the combined signal an amount equal to the delay of the signal passing through the clutter compensating circuit 25. Because the output of the summing device 30 is correlated with the signal from the auxiliary antenna 16 in correlators 35 and 36, the delay 19 (similar to the delay 26) must be included in the connection from the auxiliary antenna 16 to bring the signals into the proper time sequence.

In general, the intent of this disclosure is to define an efficient recursive estimation circuit, based on principles of Kalman Filtering (Kalman, R. E. and Bucy, R. S.: "New Results in Linear Filtering and Prediction Theory" J. Basic Engineering March 1961) for compensating a sidelobe cancellation system against the deleterious effects of clutter. Essentially this circuit takes into account the a priori statistical properties of the clutter signal such as correlation over time, defines an optimal estimate of the clutter signal component, and removes this clutter signal component from the signal entering the sidelobe cancelling circuitry (at mixers 35 and 36). Control of the gain A (53 and 69) may be varying with time over a finite record of samples and would be selected to define the optimal estimate of clutter, given the finite number of samples collected.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

I Claim

1. In communications systems including circuitry for cancelling sidelobe interference wherein signals from a main antenna and weighted signals from an auxiliary antenna are combined, with the combined signal being used to control the weight of the auxiliary antenna signal to substantially eliminate portions of the signal from the main antenna which correlate with signals from the auxiliary antenna, clutter compensating circuitry comprising estimation means for providing an output signal which is an estimate of clutter in the combined signal and circuitry connected to subtract the output signal from the combined signal prior to using the combined signal to control the weight.

2. Clutter compensating circuitry as claimed in claim 1 wherein the estimation means includes circuitry for determining differences between adjacent periodic portions of the combined sgnal and utilizing a portion of the differences as the estimate of clutter.

3. Clutter compensating circuitry as claimed in claim 2 wherein the circuitry for determining differences includes storage means for storing a first periodic portion and comparing means connected to receive the stored first periodic portion and an adjacent second periodic portion from the combined signal, to compare the two portions and supply a predetermined part of the portions which are dissimilar to said storage means as an improved estimate of clutter.

4. In repetitive signal communications systems including circuitry for cancelling sidelobe interference wherein signals from a main antenna and weighted signals from an auxiliary antenna are combined, with the combined signal being used to control the weight of the auxiliary antenna signal to substantially eliminate portions of the signal from the main antenna which correlate with signals from the auxiliary antenna, clutter compensating circuitry comprising:
   (a) storage means for receiving and storing portions of the combined signal and for providing output signals which are an estimate of the clutter;
   (b) comparison means connected to receive the next repetition of the portion and to compare it to the stored portion to obtain difference signals;
   (c) first connecting means connecting said storage means and said comparison means to combine a portion of the difference signal with the stored portions to form an updated estimate of the clutter, and further connected to store the updated estimate in said storage means; and
   (d) second connecting means combining the output signals of said storage means with the combined signal in a proper time sequence to remove clutter in the combined signal which correlates with the output signals of said storage means.

5. Clutter compensating circuitry as claimed in claim 4 wherein the repetitive signal communications system is a pulsed radar including range bins and the stored portion of the combined signal includes the data in all of the range bins in a pulse of the radar.

6. Clutter compensating circuitry as claimed in claim 4 wherein the storage means and comparison means operate at baseband.

7. Clutter compensating circuitry as claimed in claim 4 wherein the combined signal is separated into in-phase and quadrature components prior to the storage and comparison means and the components are recombined prior to the second connecting means.

8. In communications systems including circuitry for cancelling sidelobe interference wherein signals from a main antenna and weighted signals from an auxiliary antenna are combined, with the combined signal being used to control the weight of the auxiliary antenna signal to substantially eliminate portions of the signals from the main antenna which correlate with signals from the auxiliary antenna, a method of compensating for clutter comprising the steps of:
   (a) storing a portion of the combined signal;
   (b) comparing a subsequent portion of the combined signal to the stored portion to determine the difference;
   (c) combining a portion of the difference with the stored portion to produce an updated clutter compensating signal; and
   (d) combining the updated clutter compensating signal with the combined signal in a proper time sequence to remove clutter in the combined signal which correlates with the updated clutter compensating signal.

9. A method of compensating for clutter as set forth in claim 8 wherein the step of combining the updated clutter compensating signal with the combined signal includes subtracting the updated clutter compensating signal from the combined signal.

10. A method of compensating for clutter as set forth in claim 8 including the step of separating the combined signal into in-phase and quadrature components prior to storing and comparing, and the step of recombining the in-phase and quadrature components subsequent to the steps of storing, comparing and combining a portion of the difference with the stored portion.

* * * * *